Sept. 18, 1934.  J. G. HAWLEY  1,973,706
SHOCK ABSORBER
Filed Nov. 30, 1928
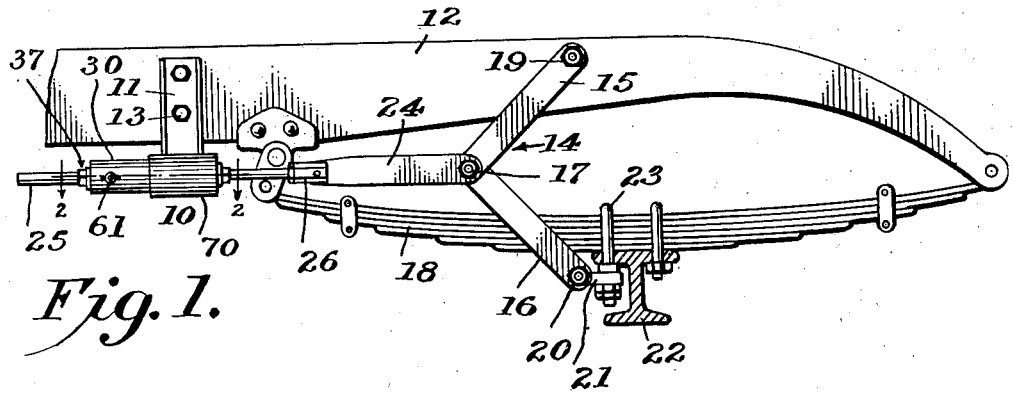
Fig. 1.
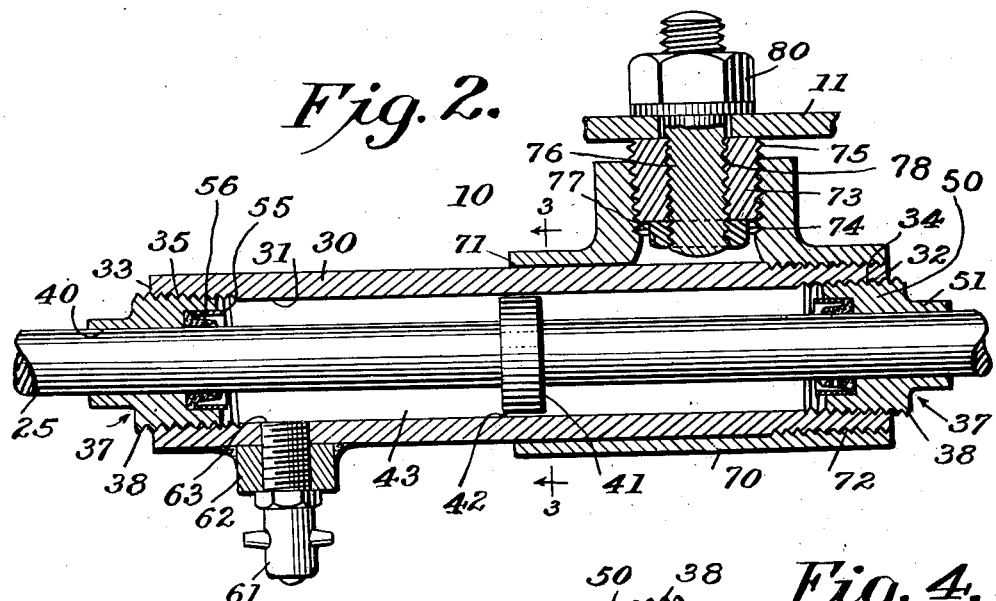
Fig. 2.
Fig. 3.
Fig. 4.
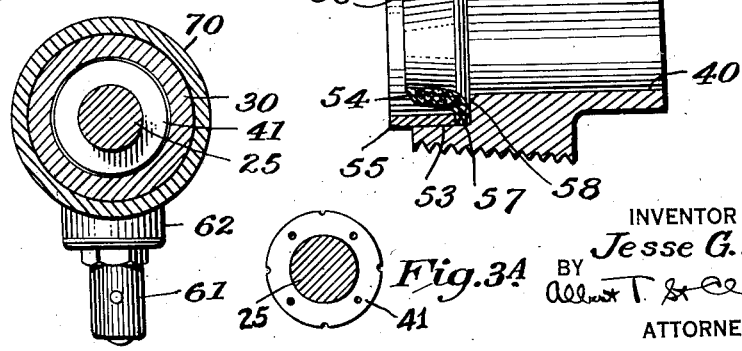
Fig. 3A
INVENTOR
Jesse G. Hawley.
BY Albert T. St Clair
ATTORNEY Patented Sept. 18, 1934

1,973,706

UNITED STATES PATENT OFFICE 1,973,706

SHOCK ABSORBER

Jesse G. Hawley, Painted Post, N. Y., assignor to Hawley-Jones Corporation, Riverside, N. Y., a corporation of New York Application November 30, 1928, Serial No. 322,871

3 Claims. (Cl. 188—88)

This invention relates to the art of shock absorbers and, more particularly, to hydraulic shock absorbers.

While many hydraulic shock absorbers have been developed, and some of them have gone into wide commercial use, all of such previous hydraulic shock absorbers with which I am familiar have varied in the resistance offered in accordance with variations in temperature, and have required valves or bypasses which had a tendency to get out of order or become clogged.

It is an object of this invention to provide a new and improved type of shock absorber which is simple in construction and efficient in operation.

It is another object of this invention to provide a shock absorber which will not need adjustment after being installed.

It is a further object of this invention to provide a shock absorber which will consist of simple parts that can easily be replaced by unskilled labor should replacement become necessary.

It is a still further object of this invention to provide a double acting hydraulic shock absorber.

It is another object of this invention to provide a shock absorber which will prevent rebound without restricting normal spring action.

It is a further object of this invention to provide the combination of a hydraulic shock absorber and an actuating mechanism provided with means for compensating for variations in the magnitude of the actuating shocks.

It is a still further object of this invention to provide a hydraulic shock absorber having means for preventing leakage of the fluid medium used.

It is also an object of this invention to provide a hydraulic shock absorber which has no valves and only requires one moving part.

With the above and other objects in view, which will be apparent as the description proceeds, I have set forth my invention in the following specification and have illustrated it in the accompanying drawing, in which:

Fig. 1 is a side elevation of my shock absorber applied to the front end of a vehicle; Fig. 2 is a longitudinal section on an enlarged scale taken on the line 2—2 of Fig. 1; Fig. 3 is a transverse section on the line 3—3 of Fig. 2; Fig. 3A is a transverse section showing a modified form of piston and Fig. 4 is a longitudinal section, on a further enlarged scale, through the packing gland.

In the accompanying drawing 10 designates my new shock absorber which is attached to a vehicle in any suitable manner, as by a bracket 11, secured to the vehicle frame 12 by bolts 13, and a toggle mechanism 14. The latter preferably consists of a pair of toggle links 15 and 16 which are pivoted together at 17 and have their opposite ends secured to the frame 12 and vehicle springs 18 by bolts 19 and 20, respectively. In practice I have found it convenient to attach the lower toggle link 16 to the spring 18 by a clamping lug 21 carried by the usual spring clip 23, which holds the spring 18 to the axle 22.

The toggle mechanism 14 is connected to the shock absorber 10 in any convenient manner, as by means of a connecting rod 24, one end of which is attached to the pivot 17 of the toggle links 15 and 16, and the opposite end of which is secured to a piston rod 25 by means of a threaded coupling 26.

As best shown in Fig. 2, my shock absorber 10 consists of a cylinder 30 provided with a bore 31 of uniform cross section and with open ends 32 and 33 which are internally threaded at 34 and 35, respectively, to receive packing glands 37 that are correspondingly threaded at 38 and are centrally drilled and reamed at 40 to receive the piston rod 25.

The latter is provided with a piston 41, which is preferably a circular disk brazed to the piston rod intermediate of its ends. As best shown in Fig. 2, the piston rod 25 extends through both packing glands 37, thus equalizing the displacement on both sides of the piston.

The external diameter of the piston is slightly smaller (for example a few thousandths of an inch) than the internal diameter of the cylinder 30 to provide a passage 42 for a liquid or semi-liquid fluid 43, such as oil, vaseline, cup grease, glycerin, alcohol or water, which is inserted in the cylinder to offer the desired resistance to the movements of the piston. By utilizing the passage 42 for the transfer of the fluid from one side of the piston 41 to the other, as the piston is reciprocated in the cylinder, it is possible to substitute a production job for a precision job in the manufacture of both the piston and the cylinder, and at the same time to make a valveless shock absorber.

As best shown in Fig. 4, the packing glands 37 may be of any suitable construction, but in their preferred form they consist of commercial pipe plugs comprising a body 50 and a head 51. These are drilled and reamed at 40, as described above, and are counterbored at 53 to receive a gasket 54 and a gasket ring 55. The gasket is preferably provided with an inwardly tapering body portion 56, in order that it may have a tight fit with the piston rod, and a flange 57 to engage the seat 58 of the counterbore 53.

In practice the packing glands are assembled by placing the gasket 54 in the counterbore 53, inserting the gasket ring 55, and tapping it into place, thus leaving a space between the portion 56 of the gasket and the interior of the gasket ring 55. This assures a permanently tight fit between the gasket 54, the pipe plug body 50, and the piston rod 25, because the pressure developed between the piston and the gasket as the former approaches the latter builds up in the cavity between the portion 56 of the gasket and the interior of the gasket ring. This presses the portion 56 of the gasket against the piston rod, and the flange of the gasket against the seat 58 of the counterbored portion, so that the greater the pressure exerted on the shock absorber the tighter will be the seal created between the interior and the exterior thereof. This is of especial advantage as it prevents the escape of the fluid. Furthermore, by the construction indicated, the packing is not compressed against the piston rod in order to securely hold the packing in position, and the packing does not carry the weight of the piston rod and piston owing to the long bearing surface formed by the drilled and reamed portion 40 in the body 50 and head 51.

The fluid 43 may be inserted in the cylinder 30 in any desired manner but, as shown herein, this may conveniently be done by providing the latter with a lubricator nipple 61, which is screwed into a lug 62 that is brazed to the cylinder and communicates with its interior through a port 63.

In practice I have found that a simple and effective method of supporting the shock absorber is to attach it to the bracket 11 by means of an ordinary pipe T 70 whose internal diameter is originally slightly smaller than the exterior diameter of the cylinder but is reamed out at one end 71 to the exact diameter of the exterior of the cylinder and is secured thereon by screwing it on the corresponding end of the cylinder, which is provided with exterior threads 72 conforming to those on the interior of the T.

I have also found that a swinging pivotal connection between the pipe T and the bracket may be conveniently provided as follows: The side opening in the pipe T is reamed out to receive a tapered pivot member 73 and is screw threaded at 74 to conform with threads 75 on the pivot member. The latter is tapped to receive a stud 76 provided with a nut 77 threaded thereon and a screw threaded shank 78. To assemble this pivotal connection the stud 76 is inserted through the small end of the pivot member, the latter is then screwed into the side opening in the pipe T to a loose fit, and the pipe T is then screwed on to the cylinder 30. The stud 76 is then passed through the bracket 11 and is tightly secured thereon by a nut 80. By leaving the pivot member 73 in a loosely fitting relation to the pipe T 70, the latter is free to rock on the former in response to the relative movements of the body and running gear, and any resulting wear can easily be taken up by loosening the nut 80 and giving the pivot member a fraction of a turn.

In practice it is generally advisable to mount the toggle links 15 and 16 so that they will form an angle of approximately 90° under the normal load to be applied to the vehicle as this is the neutral position of the toggle mechanism. When the vehicle strikes a bump or a depression, and the body and springs tend to approach one another, the angle between the toggle members is decreased and the toggle has a greater leverage than the shock absorber, thus allowing the vehicle springs to exert their normal cushioning action and merely dampening this sufficiently to prevent bottoming of the springs. As the body attempts to return to normal position the shock absorber exerts little or no resistance until the toggle links have reached an angle of approximately 90°, because the toggle still has a greater leverage than the shock absorber, hence the normal spring action is not retarded. As the toggle members attempt to separate to a greater angle, however, the shock absorber begins to have a greater leverage than the toggle, this leverage increasing in proportion to the amount the toggle is straightened, and killing the rebound. It will therefore be apparent that by my new shock absorber there is no posibility of an objectionable rebound and yet the normal action of the springs is not retarded in either direction, hence the occupants of the vehicle get a full floating ride.

Owing to the extension of the piston rod through both ends of the cylinder the shock absorber normally exerts a constant load at all times, and the toggle provides a compensation feature.

From the above description, it will be apparent that I have provided a double acting hydraulic shock absorber which does not build up shocks, which contains no valves, and in which the transfer of fluid from one side of the piston to the other is preferably effected by providing a clearance between the periphery of the piston and the interior of the cylinder, and that the degree of pressure desired is controlled by regulating the amount of this clearance. In general, it is my purpose to substitute a production job for a precision job and I have found that a clearance of approximately .010″ is sufficient to produce a scale pull of about 90 pounds pressure when a heavy liquid is used as the fluid medium, and about 50 pounds pressure when a light liquid is used, but greater or lesser clearances, as well as other pressures, may be used.

In general, I prefer to make the cylinder 30, pipe T 70, piston 41, piston rod 25, gasket ring 55, and stud 76 of steel, packing glands 37 and pivot member 73 of brass or iron castings, and the gasket 54 of leather, although other suitable materials may be used if desired.

Although various types of non-gaseous fluids may be used to offer the predetermined resistance to the passage of the piston, I prefer to use a non-clinging oil.

Although I prefer to close the ends of the cylinder 30 with the packing glands 37, other closures may be used and still retain many of the advantages of my invention.

I also desire to have it understood that, as shown in Fig. 3A, the piston 41 may be provided with perforations or with peripheral recesses either in place of or in addition to the appreciable clearance between the periphery of the piston and the internal diameter of the cylinder.

By closing the cylinder with the plugs having the threaded body portion 50, which plugs are centrally drilled and reamed at 40, the bearings for the piston rod 25 will be automatically aligned without the use of a line reamer because the tapered threads on the plugs are self-centering.

As many apparently widely different embodiments of this invention may be made without departing from the spirit and scope thereof, it is to be understood that I do not limit myself to the specific embodiments thereof except as defined in the appended patent claims.

I claim:

1. 1. The combination of a spring supported vehicle, a shock absorber, and a threaded pivot member which is rigidly attached to the vehicle and threaded into engagement with the shock absorber, to act as a pivotal support for the shock absorber.

2. The combination of claim 1 in which the support is effected by a loosely fitting pivot member.

3. The combination of claim 1, in which the pivotal support is adjustable to take up wear.

JESSE G. HAWLEY.